UNITED STATES PATENT OFFICE 2,115,807

PROCESS FOR TREATING OILS WITH SULPHURIC ACID AND FOR PREPARING IMPROVED WETTING AGENTS AND DETERGENTS

Stewart C. Fulton and Hans G. Vesterdal, Elizabeth, N. J., assignors to Standard Oil Development Company, a corporation of Delaware No Drawing. Application November 9, 1934, Serial No. 752,312

21 Claims. (Cl. 260—99.12)

This invention relates to an improved method for treating oils with strong sulphuric reagents and for the preparation of improved products therefrom and relates more particularly to the treatment of hydrocarbon oils containing olefins with fuming sulphuric acid for the preparation of improved sulphuric derivatives which are useful as wetting agents and detergents.

In the treatment of olefins and unsaturated hydrocarbon oils such as acid-reactive crude oils and fractions thereof and cracked oils containing olefins, with strong or fuming sulphuric acid, considerable difficulties are usually experienced by the formation of unstable sulphuric derivatives, which are at least partly oil-soluble with resulting impairment in the quality of both the oil and the sulphuric derivatives obtained. These disadvantages are particularly noted when using fuming sulphuric acid as the treating agent. For example, these unstable products readily develop acidity on contact with water and may render the crude sulphuric derivatives obtained unsatisfactory for use as detergents for washing acid-sensitive textiles and in other uses where even slight amounts of strong mineral acids are objectionable.

It is an object of this invention to provide an improved process by which the above disadvantages are largely and in many instances even substantially completely avoided and by which improved products such as refined oil and sulphuric derivatives of high quality may be directly obtained without the necessity of subsequent refining operations to remove undesirable by-products of the acid treating process. These and further objects will be ascertained from the following description of the invention and the claims.

It has now been discovered that if the amount of sulphuric acid is maintained constantly in excess of that required for equi-molal reaction with the organic components present, such as olefins, which are reactive under the conditions used, the formation of unstable products is substantially completely avoided. These conditions of operation may be secured in any suitable manner. The oil, containing reactive components, may be added to a bath of a strong sulphuric reagent, such as fuming sulphuric acid, maintained preferably at a low temperature at which side reactions such as oxidation and polymerization are inappreciable, as long as sulphuric acid remains in excess. The process is preferably conducted in a continuous manner, in which a stream of the oil is brought continuously into contact, with vigorous agitation, with a stream of fuming sulphuric acid containing an excess of sulphuric acid. This excess is determined by the molal ratio of reactive organic molecules, such as olefins, to sulphuric acid, not including the sulphuric anhydride present.

The ratio of acid to oil is preferably about 1.1 to 1.5 mols of sulphuric acid (not including any sulphuric anhydride present in fuming acid) per mol. of olefin or other readily reactive organic compound in the stocks treated. In treating stocks of known or readily determinable olefin content, such as pure olefins, mixtures thereof, and cracked paraffin wax fractions, the required amount of acid can readily be determined by a simple calculation. In treating more complex stocks, such as fractions of oils cracked at high temperatures and pressures, the amount of acid required for complete reaction is most conveniently determined by a preliminary small scale test, and a quantity of acid slightly in excess of the indicated required amount is then used.

The reaction temperature and the total time of contact of the reaction mixture with sulphuric acid of more than about 60% strength are preferably so limited and interadjusted that no substantial oxidation or polymerization, with formation of color bodies, occurs. The acid strength may be reduced by dilution with water and/or by neutralization, preferably with bases capable of forming water soluble salts of the organo-sulphuric derivatives, such as the alkalies and ammonia.

It is offered in explanation that the unstable components are of the nature of di-alkyl sulphates, resulting from the reaction of two molecules of olefins with one molecule of sulphuric acid, and that the use of an excess of sulphuric acid prevents this and results only in the formation of mono-alkyl sulphates, which are much more stable.

While this invention may be applied generally in the refining of oils and in the treatment of any acid-reactive organic materials, particularly those containing olefinic linkages, it is of especial value in the preparation of improved wetting agents and detergents from olefins containing about 8 to 22 or more carbon atoms, and to mixtures of such olefins and oils containing the same, such as cracked hydrocarbon oils and waxes. The preferred olefins for the preparation of detergents of high quality are those of 10 or more carbon atoms arranged in a straight chain with the olefinic linkage at or near the end of the chain. Such olefins are obtained by cracking high molecular weight paraffin, such as paraffin wax and petrolatum, preferably in liquid phase, and at pressures below about 100 pounds per square inch. Organic compounds containing an olefinic linkage, such as unsaturated fatty alcohols and acids, may also be treated according to this invention. The use, in the preparation, at low temperatures, of sulphuric derivatives suitable for use as wetting agents and detergents, of cracked petroleum oils is described and claimed broadly in copending application Serial No. 752,286 filed November 9, 1934, by Per K. Frolich, and the use of cracked paraffins is claimed specifically in copending application Serial No. 704,749, filed December 30, 1933, by William J. Sweeney. Wetting agents may also be prepared in the refining of petroleum crudes and uncracked fractions thereof at low temperatures as described in copending application Serial No. 752,313 filed November 9, 1934, by Raphael Rosen. The present invention is of value as an improved method of operating the acid-oil contacting steps of all such processes.

The use of the present invention in the preparation of detergents from cracked wax is illustrated in the following examples:

Example 1

10 volumes of a distillate fraction boiling from 400 to 600° F. and obtained by the destructive distillation of paraffin wax at atmospheric pressure were passed in a continuous stream into a mixing chamber containing a driven propeller directed against baffles. There was added simultaneously to the mixer one volume of fuming sulphuric acid containing 20% sulphuric anhydride. The mixer was cooled to 32° F. throughout the run and the reaction mixture was passed directly from the mixer into a mixture of aqueous caustic soda and cracked ice. The rate of flow was proportioned to the volume of the mixer so that the total time of reaction, from time of initial contact to neutralization, was about 75 seconds. Isopropyl alcohol of about 95% concentration was then added to the reaction mixture in sufficient amount to cause the formation, on standing, of three layers; namely, a lower aqueous layer of inorganic salts, a middle alcoholic layer containing in solution the salts of the formed sulphuric derivatives of the olefines, considered for convenience as soaps because of their detergent properties, and an upper layer of unreacted oil. The middle alcoholic layer was separately withdrawn, the alcohol removed by fractional distillation and the water by any suitable evaporation or drying method, such as the use of a spray or a drum drier, to obtain a light colored (almost white) dry sodium soap. This soap was obtained in a yield of 35% by weight, based on the oil treated. It is an excellent detergent and wetting agent in both hard and soft water and in sea water, and is stable, as indicated by no development of acidity on boiling a 5% aqueous solution for four hours.

Example 2

The same amounts of reagents were used as in the above example, except that the mixing operation was conducted as a batch process with addition of the fuming acid to a batch of the oil with vigorous stirring and cooling to maintain the same reaction temperature. After neutralization as before there was separated in the same manner an alcoholic solution of light color containing the same yield of soap. This soap, however, was unstable, developed acidity rapidly and darkened with loss of yield on drying at ordinary drying temperatures, and the dry soap, even after neutralization, developed further acidity on standing in a hot aqueous solution under the same conditions used in the test for stability of the product of Example 1. This soap is also unstable in such test even if dried under vacuum at low temperature in order to prevent dissociation on drying.

Similarly, when only 0.65 volume of fuming acid was used in the process of Example 1, the resulting product was unstable, and was obtained in a smaller yield of only about 25%.

The mixing operation shown in Example 1 may also be conducted at substantially higher temperatures, say 70 to 100° F., without impairment in the quality of the finished soaps, especially if the time of contact is decreased to about 30 seconds or less. This is due to the short time of reaction used, which is claimed broadly in copending application Serial No. 752,284 filed November 9, 1934, by Edwin J. Gohr. If longer times of contact such as thirty minutes or more, as are ordinarily used in acid treating of oils, are used, it is necessary to maintain the reaction temperature below about 40° F. to obtain high quality detergents from cracked paraffin wax, and even lower temperatures should be used in treating cracked petrolatum and cracked or crude oils and fractions thereof. Temperatures of 10 to 20° F. are preferred for such operation.

The strength of acid may be adjusted as desired and is preferably selected so as to obtain an acid which is liquid at the treating temperature used; for example, about 10 to 25% sulphuric anhydride. While fuming acids up to about 65% content of sulphuric anhydride may be used it is generally unnecessary to use the stronger acids because of the desirability of maintaining at all times in the acid treating reaction an excess of sulphuric acid ($H_2SO_4$) above an equal molecular proportion of acid to olefin.

This invention is not to be limited to any specific description or examples which have been presented herein solely for purposes of illustration but is to be limited only by the following claims in which it is desired to claim all novelty insofar as the prior art permits.

We claim:

1. Process for the production of sulphuric derivatives of olefines comprising mixing fuming sulphuric acid in excess with liquid olefines at a reaction temperature, continuously maintaining in the reaction zone more than one mol. of sulphuric acid, exclusive of the sulphuric anhydride present, per mol. of olefin.

2. Process for the production of sulphuric acid derivatives of olefines comprising bringing a stream of liquid olefines into contact, with vigorous agitation, with a stream of fuming sulphuric acid in excess at a reaction temperature, continuously maintaining in the reaction zone more than one mol. of sulphuric acid, exclusive of the sulphuric anhydride present, per mol. of olefin.

3. Process according to claim 2 in which said reaction temperature is below about 100° F.

4. Process for the acid treatment of hydrocarbon oils containing olefines comprising bringing a stream of said oil continuously into contact, with vigorous agitation, with a stream of fuming sulphuric acid in excess, at a reaction temperature, continuously maintaining in the reaction zone more than one mol. of sulphuric acid, exclusive of the sulphuric anhydride present, per mol. of olefin and separating sulphuric derivates of olefines from the reaction mixture.

5. Process according to claim 4 in which said oil is a petroleum oil.

6. Process according to claim 4 in which said oil is a cracked petroleum oil.

7. Process according to claim 4 in which said oil is a cracked paraffinic mixture of the class consisting of paraffin wax and petrolatum.

8. Process for the production of improved sulphuric acid derivates of olefines comprising bringing a stream of olefines of more than about 8 carbon atoms continuously into contact, with vigorous agitation, with a stream of fuming sulphuric acid in excess at a reaction temperature, continuously maintaining in the reaction zone more than one mol. of sulphuric acid, exclusive of the sulphuric anhydride present, per mol. of olefin, immediately and continuously reducing the concentration of free sulphuric acid in the reaction mixture to below about 60% strength.

9. Process for preparing improved wetting agents and detergents comprising bringing a stream of cracked paraffin of the class of paraffin wax and petrolatum, containing olefines of above 8 carbon atoms continuously into contact with vigorous agitation, with a stream of fuming sulphuric acid in excess at a reaction temperature and for a time insufficient to permit formation of substantial amounts of color bodies and polymerization products, continuously maintaining in the reaction zone more than one mol. of sulphuric acid, exclusive of the sulphuric anhydride present, per mol. of olefin, immediately and continuously reducing the concentration of free sulphuric acid in the reaction mixture to below about 60% strength, separating the resulting sulphuric derivatives of olefines from hydrocarbons and neutralizing said derivatives with a suitable alkali to form a salt of said derivatives.

10. Process according to claim 9 in which said cracked paraffins are prepared by cracking said paraffins in liquid phase.

11. Process according to claim 9 in which said cracked paraffins are prepared by cracking said paraffins by destructive distillation at a pressure below about 100 pounds per square inch.

12. Process according to claim 9 in which said acid strength is reduced by neutralization of said reaction mixture with an aqueous alkali.

13. Process according to claim 9 in which said acid strength is reduced by dilution with water.

14. Improved organo-sulphuric derivatives, prepared according to claim 1.

15. Process according to claim 8 in which said olefines comprise a mixture of olefines obtained by cracking a paraffine of the class consisting of paraffine wax and petrolatum.

16. Process according to claim 8 in which said olefines comprise a mixture of olefines obtained by cracking a paraffine of the class consisting of paraffine wax and petrolatum in liquid phase.

17. Process according to claim 8 in which said olefines comprise a mixture of olefines obtained by cracking a paraffine of the class consisting of paraffine wax and petrolatum by destructive distillation at a pressure below about 100 lbs. per square inch.

18. Process for preparing improved wetting agents and detergents, comprising mixing fuming sulphuric acid in excess with liquid olefins of more than 8 carbon atoms per mol. with more than 1 mol. of sulphuric acid, exclusive of the sulphuric anhydride present, per mol. of olefin, and neutralizing the resulting sulphuric acid derivatives with a suitable alkali to form a salt thereof.

19. Process according to claim 18 in which the proportion of fuming acid to olefin continuously maintained in the reaction zone is from 1.1 to 1.5 mols of sulphuric acid, exclusive of the sulphuric anhydride present, per mol. of olefin.

20. Process according to claim 18, in which the said fuming sulphuric acid contains from 10 to 25% of sulphuric anhydride.

21. Improved wetting agents and detergents prepared according to the process of claim 18.

STEWART C. FULTON.
HANS G. VESTERDAL.